United States Patent [19]

Boyle

[11] 4,223,066

[45] Sep. 16, 1980

[54] FIRE RETARDANT TREATMENT OF FIRE UNSTABLE MATERIALS AND PRODUCTS OBTAINED

[75] Inventor: Robert J. Boyle, New Galilee, Pa.

[73] Assignee: Arco Polymers, Inc., Philadelphia, Pa.

[21] Appl. No.: 41,665

[22] Filed: May 23, 1979

Related U.S. Application Data

[63] Continuation-in-part of Ser. No. 866,737, Jan. 3, 1978, abandoned.

[51] Int. Cl.² .............................................. B32B 3/26
[52] U.S. Cl. .................................. 428/306; 427/180; 428/309; 428/310; 428/537; 428/540; 428/541; 428/920; 428/921
[58] Field of Search ............... 428/306, 309, 310, 540, 428/541, 920, 921, 537; 427/180

[56] References Cited

U.S. PATENT DOCUMENTS

| | | | |
|---|---|---|---|
| 3,318,725 | 5/1967 | Bryan | 428/921 |
| 3,817,822 | 6/1974 | Dawes | 428/921 |
| 3,824,200 | 7/1974 | Matalon | 428/921 |
| 4,076,871 | 2/1978 | Short | 428/921 |

*Primary Examiner*—Marion McCamish
*Attorney, Agent, or Firm*—Hubert E. Evans

[57] ABSTRACT

Pressure treatment of fire unstable materials by an intumescent fire retardant composition which is injected or insinuated into the surface of fire unstable materials results in a fire and flameproof structure with a high capacity to withstand prolonged exposure to flame and heat.

10 Claims, No Drawings

FIRE RETARDANT TREATMENT OF FIRE UNSTABLE MATERIALS AND PRODUCTS OBTAINED

CROSS-REFERENCE TO RELATED APPLICATIONS

This application is a continuation-in-part of copending patent application Ser. No. 866,737 filed Jan. 3, 1978, now abandoned.

BACKGROUND OF THE INVENTION

Fire retardant compositions are generally applied to fire unstable materials as a surface coating. The composition, in a liquid form, is applied to the surface by brush painting, or spray painting or by some form of printing equipment, such as the use of a doctor roll. If the liquid is a viscous relatively thick material, its effectiveness will depend on its ability to adhere to and remain on the surface of the fire unstable material during production, handling, installing and use of the resultant fire retardant structure. Upon exposure to flame and heat, it may separate from the surface or the action of the flame and heat to the fire unstable material and defeating the purpose of applying the fire retardant material.

When the fire retardant material is relatively inert, or has an inert surface finish as in the case of polymeric materials or a particle board bonded with a resinous type material, such as, phenol-formaldehyde resin, it is difficult to get good adherence of the fire retardant composition.

The use of additional substances in an attempt to increase adherence may be self-defeating. Adhesives, solvents, etc. may offset or detract from the effectiveness of the fire retardant material. These substances may be flammable themselves or may react with the fire retardant composition in some fashion to lessen its usefulness.

The present invention has as a principal object the incorporation of intumescent fire retardant compositions into the surface of fire unstable materials so that they will tenaciously adhere and remain as a part of the fire unstable material during production, handling and use of the resulting fire retardant structure. It has also been discovered that by the present invention the resistance to flame and heat exposure of the resultant structure are significantly enhanced.

SUMMARY OF THE INVENTION

A method for treating fire unstable materials with an intumescent fire retardant composition and the resulting fire and flameproof structure are provided. The method involves insinuating or pressure injecting an intumescent fire retardant composition into the surface of a fire unstable material to an appreciable depth and thus tenaciously adhering composition thereto so that the resultant structure will not be subject to damage by abrasion or impact during handling and usage. The structure also provides resistance to the detrimental effects of the flame and heat during exposure thereto and a fire and flameproof structure is created.

DETAILED DESCRIPTION OF THE INVENTION

The present invention relates to a treatment of fire unstable materials so that the intumescent fire retardant composition is pressure injected or insinuated into the surface of the fire unstable material to an appreciable depth. It is accordingly tenaciously adhered to the fire unstable material, and in fact incorporated into the material so that the resulting structure is rendered more protective against exposure, even for prolonged times, to fire and heat.

The fire unstable materials may be in the form of stratas or layers having large surface areas. The fire unstable material may be made of paper, cardboard, wood, other cellulosic materials, synthetic plastic materials of a polymeric type, or the like. They may also be made of glass or metal fibers which may be subject to severe deterioration in the presence of prolonged heat and flame. Such materials may be in the foam of boards, stratas, or even laminates, depending upon the use to which they are to be put and the structural requirements desired. Since the present invention in general relates to a surface treatment of the fire unstable material it will in general be discussed with respect to boardlike structures such as wood, polymeric materials, especially polystyrene, polyurethane and the like in a foamed cellular configuration, but it will be appreciated that the invention is applicable to the surface treatment of any fire unstable materia. Thin metal and alloys, particularly those of aluminum and magnesium used in aircraft or mobile homes may be subject to severe damage and even burning when exposed to flame and heat.

In accordance with the present invention, suitable fire or flame retardant intumescent compositions may encompass a wide variety of chemical compositions having the characteristics of imparting to the surface of a fire unstable material a desired resistance to flame and heat. Fire retardant compositions are available which when applied to the surface of a synthetic polymeric material have the effect of rendering the material incapable of supporting combustion when the source of ignition or flame is removed from the vicinity of the fire unstable material. Many of these chemicals depend on a halogen content to provide fire and flame retardant characteristics. Metallic oxides are another well-known ingredient for fire retardant compositions. Various combinations of halogenating materials and metallic oxides may be useful.

It is believed that to obtain more nearly fire and flameproof structures, fire retardant compositions having intumescent properties are the most desirable. Such compositions under exposure to heat and/or flame appear first to soften and then yield a voluminous foam which serves as an insulating barrier to protect the fire unstable material. Upon prolonged exposure to flame and heat, the insulating intumescent foam carbonizes and forms a stable insulating char which continues to protect the fire unstable materials with remarkable efficiency.

For the purposes of this application an intumescent fire retardant composition is defined to mean a composition that after being applied to a fire unstable material and then exposed to flame and heat, tends to soften and appear almost as a liquid. The intumescent composition then copiously intumesces and provides a thermal insulating foam barrier with a relatively low density of about 0.2 to about 2 pounds per cubic foot and a generally closed, finely divided cell structure which protects the fire unstable material from degrading and losing its dimensional stability. Upon continued exposure to flame and heat the thermal insulating foam barrier will become a porous char or residue which is nonflammable but has adequate insulation strength and flame resistance so that the fire unstable material does not degrade for a prolonged period of time.

A particularly preferred fire and flameproof intumescent composition is that obtained due to the reaction of phosphoric acid and a reducing sugar with the possible addition of at least one supplemental foam producing additive. Compositions of this type can provide intumescence at significantly lower temperatures such as below 100° C., and thus provide earlier and longer lasting protection. Fire and flameproof compositions for use in the present invention have been derived from the teachings of the patents of Dr. Ralph Matalon in U.S. Pat. Nos. 3,551,365, 3,808,159, and 3,824,200. Also of great interest are the compositions taught in the Matalon pending application Ser. No. 006,728, filed Jan. 26, 1979; which is a continuation of application Ser. No. 871,959, filed Jan. 24, 1978, now abandoned; which is a continuation of Ser. No. 755,596, filed Dec. 30, 1976, now abandoned.

While a number of fire retardant compositions may be used to illustrate the present invention, a particularly suitable composition is being selected because of its highly effective properties. This composition involves the resinous reaction product of a resin forming substance (designated as RF71) and a hardener substance (designated as 175F). The resin forming substance comprises the following approximate weights of ingredients: 3% water, 41% phosphoric acid (85% strength, it being understood that the strength of the acid used is dependent upon the water that may exist elsewhere in the formulation and the strength or amount of acid may be adjusted to compensate), and dextrose 56%.

It is generally desirable to increase the intumescent properties of the resin former for its intended fire resistant use by the addition of at least one substance having the property of evolving gas, especially under the influence of heat. Examples of such substances are monoammonium phosphate, oxalic acid, urea, monoethanolamine, and the like. Illustrative of a resin former substance having such additives is that identified as RF77, comprising the following proportions by weight: about 3% water, about 31% phosphoric acid (85% strength), about 43% dextrose, about 8% monoammonium phosphate, about 4% oxalic acid, about 10% urea, and about 1% monoethanolamine.

The resin former substances may be prepared by charging with water and phosphoric acid to a kettle and heating the same to about 70°-90° C. The reducing sugar is added and the mixture agitated for about 10 to 15 minutes. Any additional desired additives to provide increased intumescence in the final product are added and also thoroughly agitated. The kettle is closed, heated to about 120° C. for about 10 minutes, allowed to cool, and the contents discharged.

A suitable hardener or curing agent may comprise the following ingredients by weight: water about 4%, dextrose about 35%, urea about 28%, sodium hydroxide (3% strength) about 3%, furfuryl alcohol about 5%, and paraformaldehyde about 25%. The following procedure is illustrative of the method of making the hardening agent. The sodium hydroxide, water, furfuryl alcohol, and paraformaldehyde are charged to a reactor and mixed until dissolved at a temperature of approximately 90° C. The dextrose is added and mixed until a homogenous solution is formed. The mixture is cooled or allowed to cool to about 40° C., followed by addition of the urea and monoethanolamine. This results in an exothermic reaction and it is desired that the mixture be allowed to heat, but not to rise above the temperature of 110° C., with the reactor closed. The mixture is held for about 25 minutes, allowed to react and then discharged. Alternatively, water and dextrose may be charged to the kettle, heated and mixed until they are dissolved at about 90° C. The urea is charged and stirred until dissolved. The kettle is allowed to cool or is cooled by heat transfer to about 60° C., at which time the sodium hydroxide, furfuryl alcohol, and the paraformaldehyde are added. The kettle is closed, heated to about 110° C. and stirred while maintaining the temperature for about 25 minutes. As the temperature cools, the monoethanolamine may be added and stirred. When the mixture is cooled, it is then ready for use.

The fire and flame retardant composition is then prepared by mixing the resin former and the hardener. They may be mixed in a preferred ratio of about 1 to 1; however, this ratio may be varied with the approximate range of resin former to hardener being about 3 to 1 to about 1 to 4 depending upon the physical properties or function desired in the resultant composition. The end product is a thick, viscous liquid having a density of about 1½ grams per cubic centimeter.

To accomplish the surface treatment of a fire unstable material, the fire and flame retardant composition has been made into the form of a powder. This may be accomplished by heating the liquid fire retardant composition in a vessel having a large surface area compared to volume and then comminuting or grinding the dried cake to a powdered or pulverized form. A particularly desirable flame retardant powder is produced by mixing the previously described resin former and hardener in a ratio of 1 part former to 1 part hardener. The mixture is heated to a temperature of approximately 70° to 80° C. and held until it becomes a dried cake in about 72 to 90 hours. The cake is relatively friable. In its powdered form it has a higher bulk density than in liquid form, and is considerably less soluble in water than the liquid form, due to the reaction occurring during the drying stage.

For applying the pulverized fire retardant composition to a fire unstable material it has been found particularly effective to use sandblasting equipment, such as a small portable sandblaster available in hardware stores. The piece of equipment used in the testing to be described developed a pressure of 100 pounds per square inch. The sandblasting pressure used may be increased up to, say, about 200 pounds per square inch. Higher pressures do not seem to be necessary to obtain good results, and pressures over 500 pounds per square inch are not only unnecessary but may have a harmful effect on the fire unstable material. The powdered material is held in a reservoir and aspirated into the high pressure air stream for application to the desired surface. In operation the sandblaster was held at a distance of approximately 3 to 4 inches away from the surface of a foamed polystyrene or foamed polyurethane board and the surface was sandblasted for the length of time desired to apply the predetermined quantity of fire retardant composition. The application of the sandblasting process does not require any heat and is preferably carried on at ambient conditions.

In carrying out the present invention, it was found that the foamed polystyrene and foamed polyurethane surfaces were penetrated as much as about 1/32 of an inch or up to 3/32 of an inch depending on the manner of use of the sandblaster, and the density of the polystyrene or polyurethane. For wood, a little greater penetration may be had, such as about 1/16" to ¼", dependent on the density of the particular wood. It is desirable that adequate penetration is achieved to cause the fire retardant composition to be securely adherent to the fire unstable material; but because it is an intumescent composition proximity to the surface is desirable.

The sandblasting with a fire retardant composition of a surface of a fire unstable material as described above was performed on the surface of foamed polystyrene. A foamed cellular polystyrene surface made from cutting a molded billet, having a density of about 1 pound per cubic foot, exposes both open and closed cells, and has a cell size generally averaging from about 3 to 8 mils in diameter. Foam polystyrene is a generally closed cell structure, with the exception of those cells that have been laid open by the cutting operation. In appearance the board surface has not materially changed due to the sandblasting treatment. There is no significant rupture or crushing of the polystyrene cellular structure due to the sandblasting. At the same time the fire retardant composition has been pressure injected into and through the polystyrene foam cellular structure, possibly through the interstices between the cell boundaries.

It has also been found that the sandblast treatment seems to be more effective when the surface to which it is to be applied is moistened prior to treatment. When higher amounts of fire retardant powdered composition are to be used, wetting the surface to be treated with water facilitates the heavier sandblasting treatment, and assists in retention of the increased amount of composition.

The advantages and utility of structures treated as described in accordance with the present invention are dramatic and surprisingly remarkable. To establish this, untreated and treated samples were given a rather severe test, designated as a Modified Bureau of Mines Burn Through Test. In this test, samples one foot square and of a thickness as described are supported in a horizontal position on a tripod. Each sample is supported two inches above the top of a Fisher burner. The horizontal placement of the sample and the substitution of a Fisher burner for a propane torch are the modifications adopted for this test that differ from the Bureau of Mines Burn Through Test. The flame of the Fisher burner is adjusted to a 4½" height with a 1½" inner core. A cellulosic tissue is placed on the top of the sample and the sample is supported horizontally on the tripod above the flame. Burn through time is indicated by ignition of the tissue. Results of this testing are illustrated in the following examples.

EXAMPLE I

A piece of foamed polystyrene board 12" by 12" by 1" thick made from expandable polystyrene, sold under the trademark DYLITE M-57, was subjected to the Modified Bureau of Mines Burn Through Test and experienced a burn through time of seven seconds with a weight loss of 50% of the sample.

A plurality of identical samples were treated by the sandblasting method with a dry powder made from a resinous fire retardant composition as previously described. The samples were treated with the sandblast material on top and bottom faces, some samples being given a treatment amounting to 12½ grams per square foot of fire retardant powdered composition, others at 25 grams per square foot and still others at 50 grams per square foot. All of the samples were faced on the two major surfaces with 2 mil aluminum foil. No burn through of any of the samples was experienced over a period of 30 minutes exposure. The weight losses of the various samples ranged from about 14.8 to about 20.3%.

Another sample, untreated by the fire retardant composition, and having a facing of 0.3 mil aluminum foil on the surface facing downward, i.e., the flame side, experienced a burn through of 15 seconds.

Thus, the sandblasting treatment with the fire retardant composition resulted in foam polystyrene samples that were exposed to the test without burn through for a greatly increased exposure of the relatively flammable material, polystyrene, from 7 or 5 seconds to over 1800 seconds.

EXAMPLE II

A sample of polystyrene foam board similar to those used in Example I but having a thickness of 2" was subjected to the Burn Through Test and burn through was experienced in 10 seconds.

An identical sample having a coating of liquid fire retardant composition formed by the admixture of resin former and hardener in a ratio of 1 part resin former to 2 parts hardener applied to the top and bottom surface of the polystyrene foam in the amount of 25 grams per square foot, with a facing of 0.3 mils aluminum foil experienced a burn through of 2 minutes and 13 seconds.

Samples of 2" thick polystyrene foam board exposed to the sandblast treatment and faced with a 2 mil aluminum foil coating on both surfaces did not experience any burn through in 30 minutes. The weight loss of the samples averaged from 12.9% to 23.5%.

In this Example II, it will be noted that the sandblasted samples showed an increase in exposure time from 133 seconds to over 1800 seconds, showing the marked advantages of sandblasting with a pulverulent fire retardant composition over the use of the same composition coated in a liquid form.

EXAMPLE III

In this case samples of modified rigid polyurethane board 12" by 12" by 2" thick were tested by the Burn Through Test to compare the burn through exposure time of a control sample having no sandblasting or other fire retardant treatment in contrast with samples treated by sandblasting with fire retardant composition in the amount of 12½ grams per square foot and 25 grams per square foot, with and without facings of aluminum foil 2 mils thick on both the top and bottom surfaces. Table 1 shows the results of this testing with comments regarding the amount of burning of the sample. It will be noted that the untreated control sample exhibited extreme burning of its outer surfaces whereas the samples treated by the sandblast method showed no surface burning whether or not they were faced with the aluminum foil.

TABLE 1

| Surface Treatment gms/sq.ft. | Facing | Burn Through Time 30 Minutes Test | Comments |
| --- | --- | --- | --- |
| Control 0 | 0 | 12 minutes | Extreme burning of outer surfaces |
| 12.5 | 0 | 0 | No surface burning |
| 12.5 | 2 mil Al foil | 0 | No surface |

TABLE 1-continued

| Surface Treatment gms/sq.ft. | Facing | Burn Through Time 30 Minutes Test | Comments |
|---|---|---|---|
| 25.0 | 0 | 0 | burning No surface burning |
| 25.0 | 2 mil Al foil | 0 | No surface burning |

EXAMPLE IV

A sample 12"×12"×⅜" of pine board was subjected to the Burn Through Test as a control, and after four minutes exposure there was complete envelopment of the sample by the flame. In other words, the sample became completely on fire and was consumed. A similar sample treated by sandblasting with a powdered fire retardant composition at the rate of 25 grams per square foot on both of its major surfaces was subjected to the Burn Through Test. After exposure for 60 minutes there was no burn through and no apparent effect on the sample.

EXAMPLE V

A piece of plywood of a size 12"×12"×¼" thick was submitted to the Burn Through Test as a control and after exposure for about 2 minutes there was complete envelopment of the sample by fire.

A similar sample which had been sandblasted with pulverulent fire retardant composition at a rate of 25 grams per square foot on both of the major surfaces was exposed to the Burn Through Test and after 90 minutes there was no burn through and no apparent effect on the sample.

A number of samples of structures sandblast treated in accordance with the present invention were subjected to a more severe test, known as the Underwriters' Laboratories Tunnel Test. It is entitled "Test Method for Fire Hazard Classification of Building Materials UL73". The text was approved as ANSI A2.5-1970, Apr. 14, 1970 by Underwriters' Laboratories, Inc. In this test, a sample is supported and enclosed within a horizontally extending duct or tunnel which is equipped with gas burners at one end and provided with controlled draft conditions all along the length of the tunnel. Each test sample is 20" wide and 25' long. As an oversimplified summary, the test compares the fire hazard classification of a given sample to asbestos cement board (non-combustible) and having a rating of 0 with select red oak flooring (combustible) having a rating of 100. Ratings are obtained for flame spread, fuel contributed, and smoke density developed. The sample is installed in the closed duct and forms the roof of the duct. The duct itself is 17½" by 12" by 25' long. The test is begun by lighting the gas burners and allowing the sample to be exposed to the gas flame under the specified test conditions for a period of 10 minutes. Data is recorded at constant intervals throughout the test procedure. Readings are obtained for the flame spread and the smoke density. In the case of polymeric materials as well as some other materials, the fuel contributed data is considered not meaningful, and although recorded by Underwriters' Laboratories in the test is omitted from the data results presented in this description.

EXAMPLE VI

In this example, the samples undergoing the Tunnel Test are individually described and the test results are tabulated in Table 2.

Sample 1, a control sample, was a foam polystyrene board 2" thick, 20" wide and 25' long. It had a density of about 1.0 pounds per square foot and was made from slabs cut from a molded billet of expandable polystyrene, sold under the trademark DYLITE M-57. This sample was completely consumed during the test.

Sample 2 was also a foam polystyrene board 2" thick. It was coated with a resinous liquid mixture of resin former and hardener in the ratio of 1 part resin former to 2 parts hardener. The coating was deposited at the rate of 25 grams per square foot. The sample was faced on both sides with aluminum foil of 0.3 mils. In this case, under the severe test conditions and even though coated on both sides with a fire retardant composition, the board was 100% consumed.

Sample 3 was a similar foam polystyrene board 1¾" thick. It had been sandblasted in accordance with the present invention depositing a coating of 25 grams per square foot on each side of the sample and the sample was faced with 2 mil foil on both sides. The sample suffered a weight loss of only 13.1% after the normal 10 minute length of test.

It will be noted that the present invention provides a fire and flameproof structure capable of prolonged resistance to flame and heat.

TABLE 2

| Sample Number | Flame Spread Rating | Smoke Developed | Weight Loss % | Damage |
|---|---|---|---|---|
| 1 (Control) | 10 | 350 to over 500 | 100 | Consumed Sample melted onto tunnel floor |
| 2 | 90.7 | 423 | 100 | Consumed |
| 3 | 12.8 | 21.1 | 13.1 | Minimum Damage |

I claim:

1. A fire and heat resistant structure comprising a strata of fire unstable material having an intumescent fire retardant composition in powdered form injected into at least one major surface of such strata for an appreciable depth at a pressure sufficiently low to preclude any appreciable impairment of said material and below 500 pounds per square inch.

2. A structure as claimed in claim 1 in which the fire unstable material comprises a polymeric material.

3. A structure as claimed in claim 1 in which the fire unstable material comprises foam polystyrene.

4. A structure as claimed in claim 1 in which the fire unstable material comprises foam polyurethane.

5. A structure as claimed in claim 1 in which the fire unstable material is wood.

6. A structure as claimed in claim 1 in which the fire unstable material is plywood.

7. The method of rendering a fire unstable material capable of withstanding prolonged exposure to heat and flame which comprises injecting an intumescent fire retardant composition in powder form suspended in a stream of pressurized fluid into a surface of said fire unstable material for an appreciable depth, said fluid pressure being sufficiently low to preclude impairment of said material and below 500 pounds per square inch.

8. A method as claimed in claim 7 in which the said injection is accomplished by disposing the fire retardant composition in a pressurized air stream, and directing said stream toward said surface of said fire unstable material.

9. The method as claimed in claim 7 in which said fire retardant composition comprises a reaction product of phosphoric acid and a reducing sugar.

10. An article of manufacture having superior fire and flame resistance over a prolonged exposure time which comprises a piece of foamed polymeric material having at least its major surfaces treated by a stream of pressurized air at a pressure of up to about 120 psi having suspended therein an intumescent fire retardant composition in powdered form, said composition being present on the treated surface and for an appreciable depth thereinto, and said composition being present in an amount of up to about 50 grams per square foot of surface.

* * * * *